(12) United States Patent
Solinski et al.

(10) Patent No.: US 8,316,999 B2
(45) Date of Patent: Nov. 27, 2012

(54) STROLLER BRAKE

(75) Inventors: Andrew L. Solinski, Atlanta, GA (US);
Todd D. Sorzano, Alpharetta, GA (US);
Robert T. Pike, Cumming, GA (US);
Michael A. Dotsey, Pottstown, PA (US)

(73) Assignee: Graco Children's Products Inc.,
Atlanta, GA (US)

( * ) Notice: Subject to any disclaimer, the term of this patent is extended or adjusted under 35 U.S.C. 154(b) by 131 days.

(21) Appl. No.: 12/873,161

(22) Filed: Aug. 31, 2010

(65) Prior Publication Data

US 2011/0048867 A1    Mar. 3, 2011

Related U.S. Application Data

(60) Provisional application No. 61/238,619, filed on Aug. 31, 2009.

(51) Int. Cl.
*B60B 33/00* (2006.01)

(52) U.S. Cl. .......................................... 188/20; 188/1.12

(58) Field of Classification Search ............. 188/19, 188/20, 29, 31, 1.12; 280/658
See application file for complete search history.

(56) References Cited

U.S. PATENT DOCUMENTS

| | | | | |
|---|---|---|---|---|
| 6,298,949 B1 * | 10/2001 | Yang et al. | .............. | 188/20 |
| 6,619,438 B1 * | 9/2003 | Yang | .............. | 188/1.12 |
| 7,059,452 B2 * | 6/2006 | Chen | .............. | 188/20 |
| 7,383,925 B2 * | 6/2008 | Chen | .............. | 188/20 |
| 2007/0045055 A1 * | 3/2007 | Lan | .............. | 188/20 |
| 2008/0078630 A1 * | 4/2008 | Yeh | .............. | 188/20 |

FOREIGN PATENT DOCUMENTS

| | | |
|---|---|---|
| CN | 2406893 | 11/2000 |
| CN | 200985043 | 12/2007 |
| CN | 201228017 | 4/2009 |
| TW | 200930582 | 7/2009 |

OTHER PUBLICATIONS

Stokke Xplory User Guide; 46 pages; (admitted prior art).
Quinny Buzz User Guide; 19 pages; (2009).
Graco Mosaic Stroller Owner's Manual; 32 pages; (2006).
Chinese Office Action with English language translation issued in related Chinese application No., 201010269193.2 dated Jun. 21, 2012.

* cited by examiner

*Primary Examiner* — Christopher Schwartz
(74) *Attorney, Agent, or Firm* — Lempia Summerfield Katz LLC

(57) ABSTRACT

A brake assembly for a stroller has a wheel rotatable about a wheel axis and a plurality of pockets on the wheel spaced from and circumferentially around the wheel axis. A brake lever has an actuator arm and a link arm fixedly connected to one another and is movable between a braking orientation and a released orientation. A boss is driven by the link arm between a braking position and a released position corresponding respectively to the braking and released orientations of the brake lever. A biasing mechanism is configured to bias and retain the boss into engagement with one of the plurality of pockets when the brake lever is moved to the braking orientation and to bias and retain the boss out of engagement with the plurality of pockets when the brake lever is moved to the released position.

20 Claims, 7 Drawing Sheets

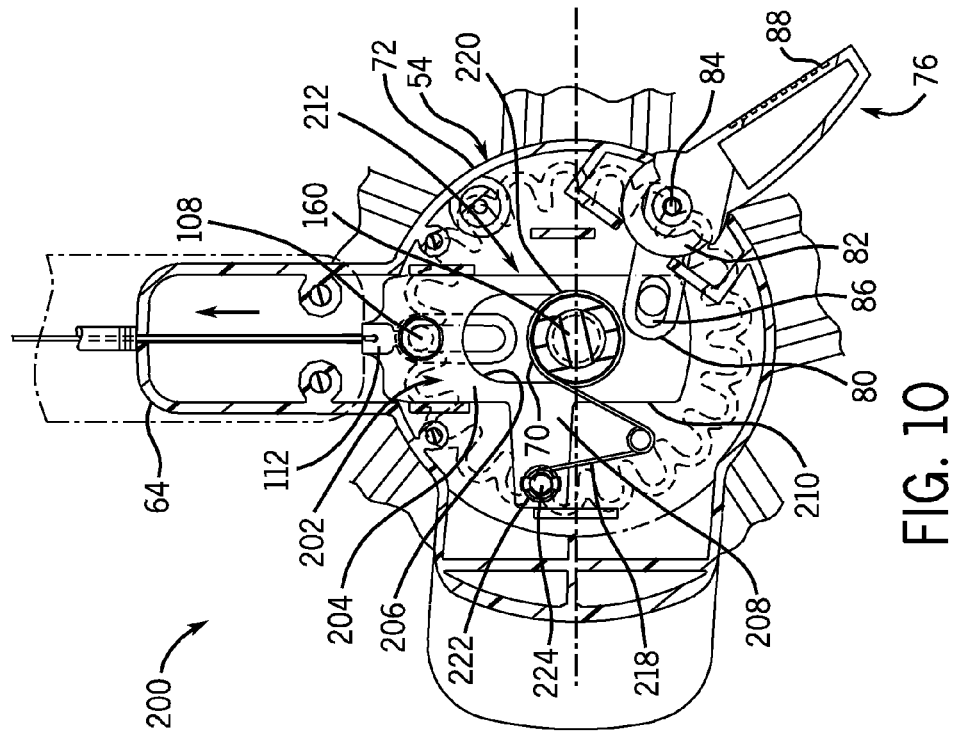
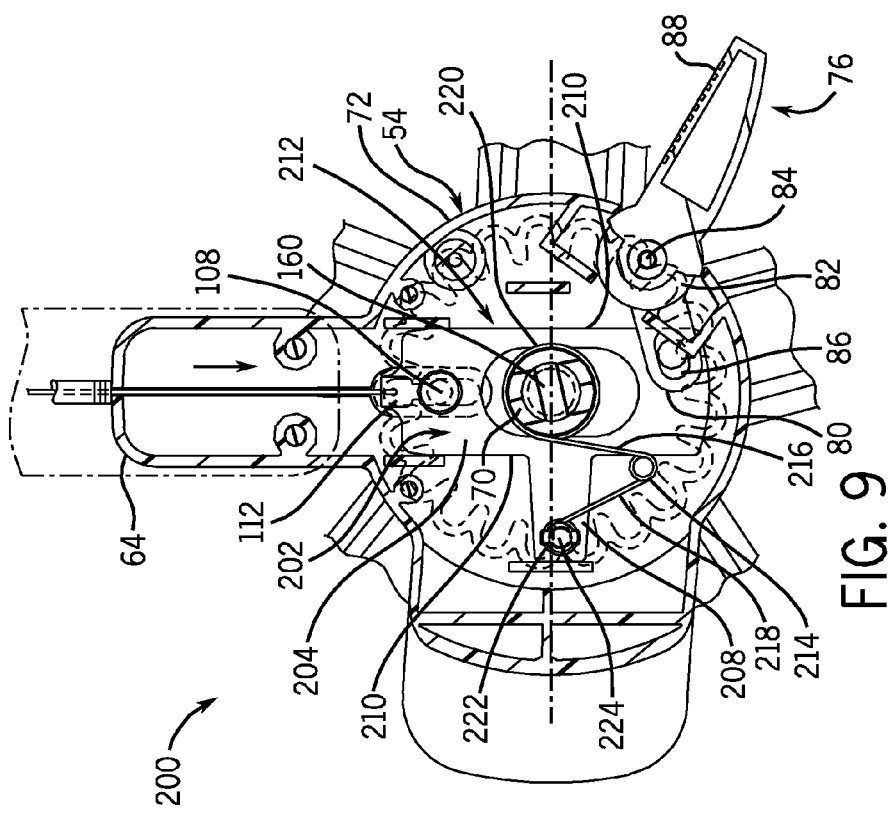

STROLLER BRAKE

RELATED APPLICATION DATA

This patent is related to and claims priority benefit of U.S. provisional application Ser. No. 61/238,619 filed on Aug. 31, 2009 and entitled "Stroller Brake." The entire contents of the above-noted prior filed provisional application are hereby incorporated herein by reference.

BACKGROUND

1. Field of the Disclosure

The present disclosure is generally directed to strollers, and more particularly to a wheel brake system and brake assembly for stroller wheels.

2. Description of Related Art

Strollers typically have a brake system for selectively preventing at least one wheel of the stroller from rotating. Some stroller brake systems include one or more brake pedals or levers located near the rear wheels to apply a rear wheel brake system on the stroller. The brake pedals or levers are typically actuated by the foot of a caregiver to lock or brake the stroller wheels from rotation or to unlock or free the stroller wheels to rotate. On some strollers, one brake lever or pedal is provided to actuate a brake on only one rear wheel.

Strollers are also known that have a brake pedal or lever on each rear wheel of the stroller, with one pedal for actuating a dedicated brake at each respective rear wheel. Strollers are also known that include a solid bar extending between the rear wheels, the bar being connected to a single pedal or lever. The bar and associated parts typically pivot up and down during release or actuation of the brake system. Such a system often incorporates a number of relatively large or bulky moving parts on each side of the stroller. The complexity of the system and/or the size and number of the parts in such brake systems have resulted in such systems to sometimes be less than reliable and often be expensive to include on a stroller product design.

Some of these known brake systems utilize relatively large components and numerous parts that traverse between the rear wheels. These parts can encroach upon foot space for a caregiver's feet during use of the stroller and may cause the caregiver to stumble or trip if their feet become entangled with the brake system parts.

A number of companies have produced and sold strollers that have brake systems, such as the solid bar type noted above, with one pedal that actuates the brake at both wheels. At least one company, Quinny, has produced strollers with a two pedal brake system. The pedals are located on either side of the stroller at each rear wheel assembly. One pedal is used to lock or apply the brakes at both of the rear wheels and the other pedal is used to unlock or release the brakes at both of the rear wheels. Another company, Stokke, is known to have produced a stroller that has a single brake pedal on one side of the stroller that actuates a discrete brake at each rear wheel on the stroller via a cable connection between the rear wheels. The Stokke brake system includes a brake lever with a rotating shuttle at each wheel and a brake pin on each shuttle that moves radially outward to engage pockets on a wheel. The parts are complex, numerous, and can bind during use.

SUMMARY

In one example according to the teachings of the present invention, a brake assembly for a stroller has a stroller wheel rotatable about a wheel axis and a plurality of pockets on the wheel spaced from and circumferentially around the wheel axis. A brake lever has an actuator arm and a link arm fixedly connected to one another. The brake lever is movable between a braking orientation and a released orientation. A brake boss is driven by the link arm between a braking position and a released position corresponding respectively to the braking and released orientations of the brake lever. A biasing mechanism is configured to bias the boss into engagement and retain the boss engaged with one of the plurality of pockets when the brake lever is moved to the braking orientation. The biasing mechanism is also configured to bias the boss out of engagement and retain the boss disengaged from the plurality of pockets when the brake lever is moved to the released position.

In one example, the plurality of pockets can be formed on a surface of a center hub on the wheel. Each of the plurality of pockets can face radially inward toward the wheel axis.

In one example, the actuator arm can be a pedal arm and can have a foot pad carried on a distal end of the pedal arm.

In one example, the wheel can be rotatable about an axle.

In one example, an axle can be received through an oblong slot of a shuttle and the wheel can be mounted for rotation on the axle.

In one example, the boss can be carried on a shuttle that is pivotally connected to the link arm. The shuttle can be movable in a linear path perpendicular to the wheel axis between the braking and released positions.

In one example, the brake assembly can include a shuttle that is movable along a linear path perpendicular to the wheel axis. The shuttle can be pivotally connected to a distal end of the link arm and can be movable between the braking and released positions. The boss can be affixed to and project from the shuttle.

In one example, the boss can be a brake pin and can be oriented parallel to the wheel axis and can protrude from a surface of a slidable shuttle and can face the plurality of pockets.

In one example, the biasing mechanism can have a torsion spring. One leg of the spring can be connected to a slidable shuttle and another leg of the spring can be connected to an over-center link. The over-center link can be rotatable about the wheel axis.

In one example, the biasing mechanism can have a spring, an over-center link, and a slidable shuttle. The shuttle can be connected to the over-center link and can be connected to the brake lever. The boss can be carried on the shuttle and the spring can be connected to the over-center link and to the shuttle.

In one example, the biasing mechanism can have an over-center link with a central opening. The central opening can be concentric with the wheel axis. The over-center link can have one end coupled a spring and an opposite end coupled to a slidable shuttle. The boss can be carried on the shuttle. The shuttle can be pivotally connected to the brake lever.

In one example, the biasing mechanism can include a torsion spring. One leg of the spring can be connected to an over-center link and another leg of the spring can be connected to a slidable shuttle.

In one example, the brake assembly can have a shuttle that slides along a linear path. The linear path can be aligned with and perpendicular to the wheel axis.

In one example, the brake lever can have an elbow between the actuator arm and the link arm and can be pivotable about a lever axis spaced from the wheel axis and located at the elbow.

In one example, a brake system can employ the above-noted brake assembly at a wheel on one side of a stroller and a second brake assembly at a wheel on another side of the stroller. A cable can interconnect the two brake assemblies. Actuation of the brake lever can simultaneously engage or disengage both of the brake assemblies.

In one example according to the teachings of the present invention, a brake system for a stroller has a first wheel rotatable on an axle on one side of the stroller. A brake actuator can be pivotally movable about a pivot point, be spaced radially from the axle, and be movable between a braking orientation and a released orientation. A first brake assembly is provided associated with the first wheel and is actuable by the brake actuator. The first brake assembly includes a plurality of pockets on the first wheel spaced radially outward from and circumferentially around the axle. A first shuttle is movable along a linear path perpendicular to the axle between a braking position and a released position corresponding respectively to the braking and released orientations of the brake actuator. The brake actuator has one end pivotally connected to the first shuttle. A first brake boss projects from the first shuttle and is configured to seat in any one of the plurality of pockets in the braking position. A first over-center linkage can be coupled to the first shuttle and the brake actuator. The first over-center linkage biases the first boss into engagement with one of the plurality of pockets when the brake actuator is moved to the braking orientation. The first over-center linkage also biases the first boss out of engagement with the plurality of pockets when the brake actuator is moved to the released position.

In one example, the brake system can have a second wheel on a second side of the stroller opposite the one side. The brake system can also have a second brake assembly associated with the second wheel. The second brake assembly can include a plurality of pockets on the second wheel, a second shuttle, a second boss, and a second over-center linkage. The brake actuator can be operable to simultaneously actuate the first and second brake assemblies.

In one example, the brake system can have a second wheel on a second side of the stroller opposite the one side. The brake system can also have a second brake assembly associated with the second wheel. A cable can interconnect the first and second brake assemblies and can extend between the sides of the stroller. The cable can be routed within a frame cross-member between the frame sides.

In one example, a first over-center linkage of the first brake assembly can include an over-center link. The over-center link can be rotatable about a rotation axis of the axle. A spring can be connected to the first shuttle and to the over-center link.

In one example, the first shuttle can have a body with a slot. The axle can extend through the slot and the shuttle can be slidable perpendicular to the axle to the extent of the slot.

In one example according to the teachings of the present invention, a stroller wheel brake system has two wheels, one on each side of a stroller frame. Each of the two wheels has a center hub defining a wheel axis. A plurality of pockets are spaced radially outward from and circumferentially around the wheel axis on each of the two wheels. A brake lever is mounted adjacent one of the two wheels and is movable between a braking orientation and a released orientation. A shuttle is positioned adjacent each of the two wheels. Each shuttle can be movable along a path perpendicular to the wheel axis between a braking position and a released position corresponding respectively to the braking and released orientations of the brake lever. A brake boss is provided on each of the shuttles. A cable extends between and connects to each of the shuttles. A biasing mechanism is coupled to each of the shuttles and is configured to bias each brake boss into engagement with a pocket on the respective wheel when the brake lever is moved to the braking orientation and to bias each brake boss out of engagement with the plurality of pockets on the respective wheel when the brake lever is moved to the released position.

BRIEF DESCRIPTION OF THE DRAWINGS

Objects, features, and advantages of the present invention will become apparent upon reading the following description in conjunction with the drawing figures, in which:

FIG. 9 shows an alternate example of a brake assembly for a stroller wheel constructed in accordance with the teachings of the present invention and in a released condition.

FIG. 10 shows the alternate brake assembly in FIG. 9 in an applied condition.

DETAILED DESCRIPTION OF THE DISCLOSURE

Some problems and disadvantages with known stroller brake systems are discussed above. The disclosed brake system solves or improves upon one or more of the above-noted and/or problems and disadvantages with prior known stroller brake systems. The disclosed stroller brake system in one example employs a biasing mechanism at a wheel on each side of a stroller that biases the brake system to a braking or applied position when the system is applied and to a released position when the system is released. The disclosed brake system in one example has a brake assembly at a wheel on each side of the stroller frame. The simple construction of the disclosed brake system may increase the reliability of the brake system, be more cost effective, and simplify construction and assembly in comparison to prior known stroller brake systems. The disclosed stroller brake system in one example is operable from one side of the stroller for braking a rear wheel on each side of the stroller while maintaining adequate foot space between the rear wheels for the caregiver while pushing the stroller. The disclosed stroller brake system in one example allows a brake on each side of the stroller to be engaged by actuating a single lever or actuator on one side of the stroller.

Figure 1:
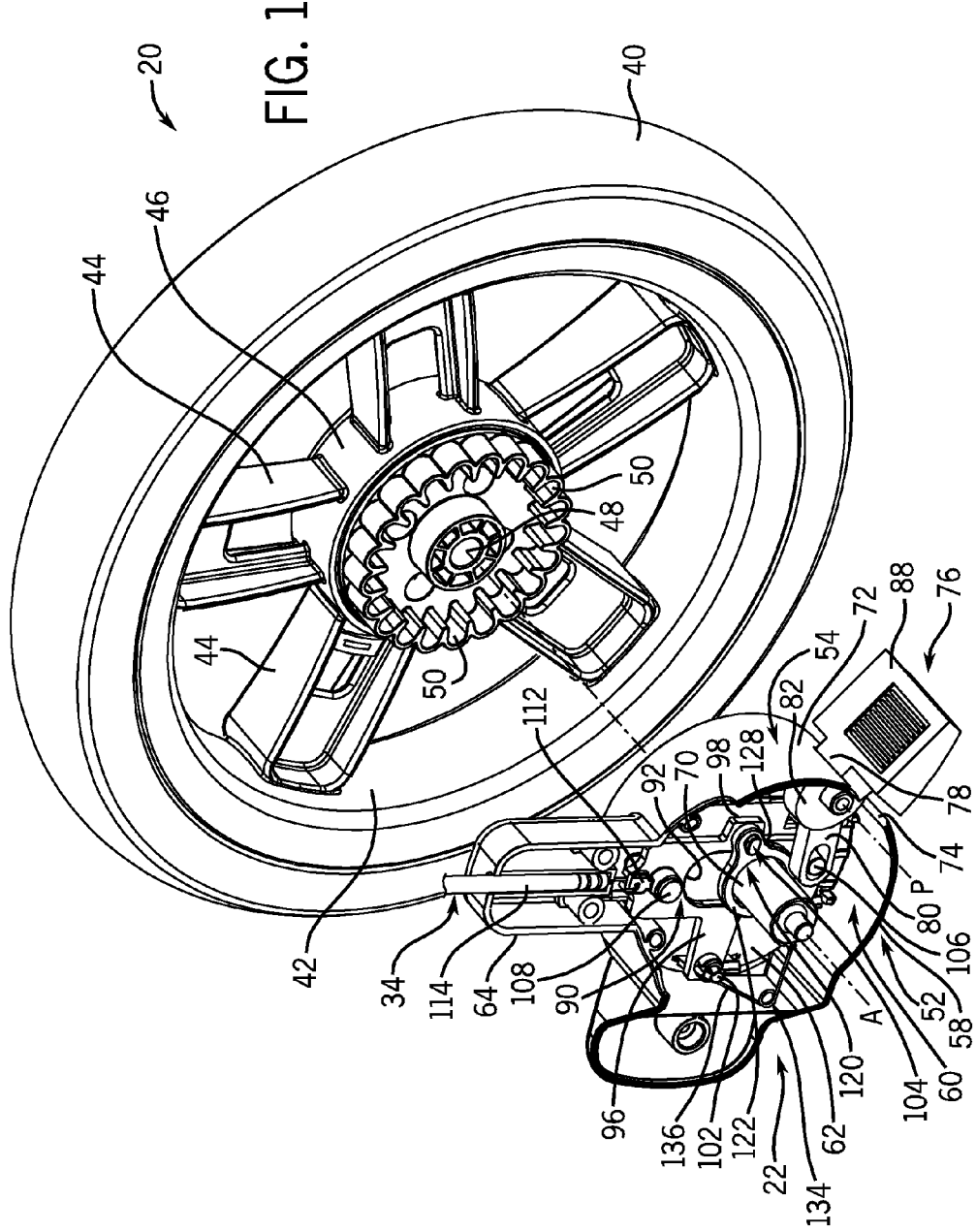
FIG. 1 shows a perspective exploded view of one example of a stroller wheel and brake assembly constructed in accordance with the teachings of the present invention.
Figure 2:
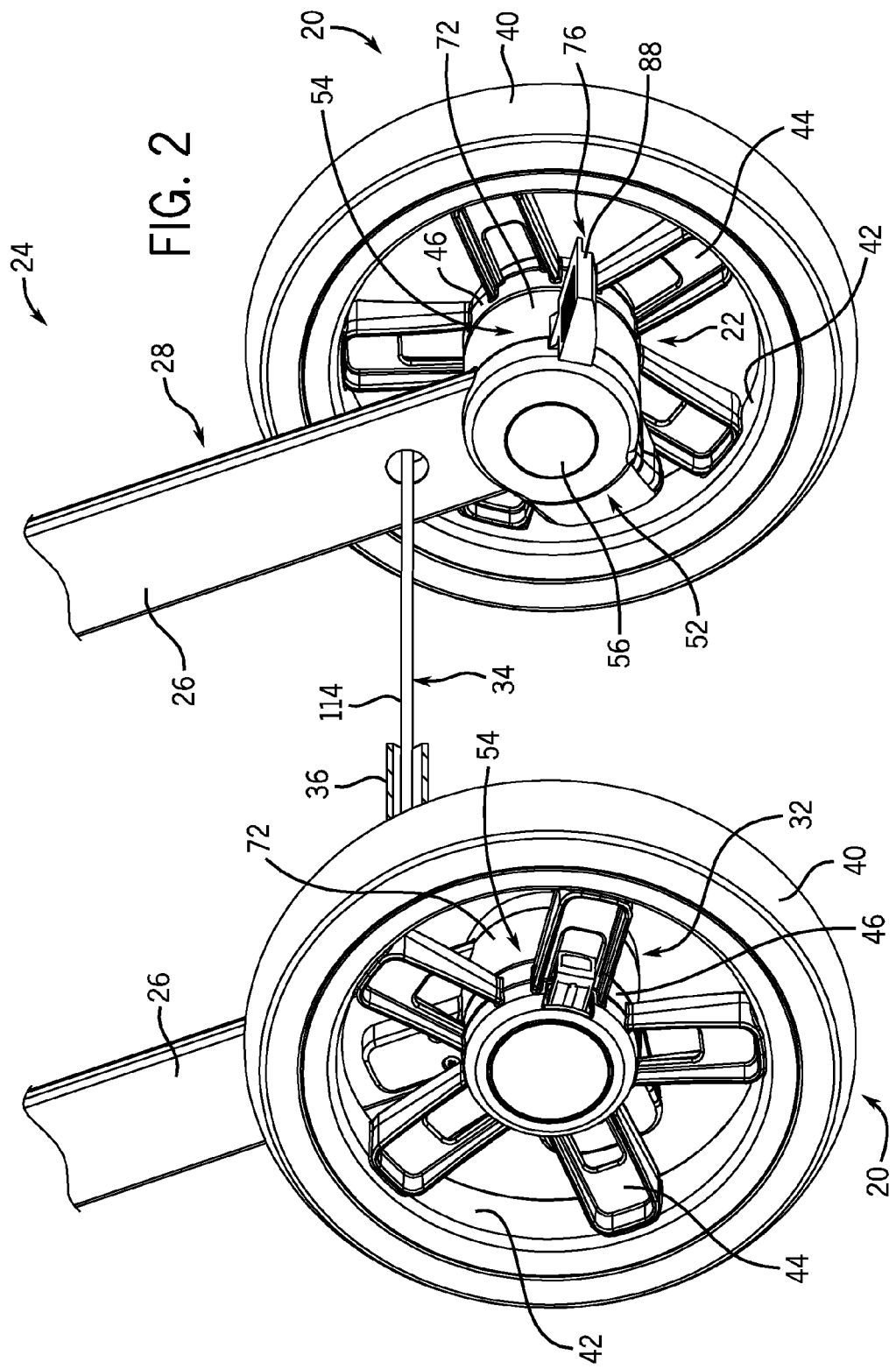
FIG. 2 shows a perspective view of one example of part of a stroller frame with wheels and a brake system employing the brake assembly of FIG. 1.

Turning now to the drawings, FIG. 1 shows one example of a stroller wheel 20 and a first brake assembly 22 constructed in accordance with the teachings of the present invention. FIG. 2 shows one example of part of a stroller 24 including a pair of spaced apart rear legs 26 of a stroller frame 28. In this example, the stroller 24 has a pair of rear wheels 20, one on each side of the stroller frame 28 attached to a lower end of each of the rear legs 26. As will become evident to those having ordinary skill in the art upon reading this disclosure, the configuration and construction of the stroller 24, stroller frame 28, and rear legs 26 can vary within the spirit and scope of the present invention. The disclosed brake assembly 22 and brake system can be applied to stroller wheels on the front legs of a stroller if desired, though such an arrangement is not shown herein.

With reference to FIG. 2, a brake system 30 is illustrated and constructed in accordance with the teachings of the present invention. In this example, the brake system 30 employs a pair of the brake assemblies including the first brake assembly 22 on one side of the stroller frame 28 attached to one of the rear legs 26 and a second brake assembly 32 on the other side of the stroller frame attached to the other rear leg. In the disclosed example, a push-pull cable 34 extends between the first and second brake assemblies 22 and 32 in order to simultaneously apply or release the brake system 30 as described below. In this example, the cable 34 is routed through an interior of a frame cross member or tube 36 that extends transversely between and interconnects the two rear legs 26 of the stroller frame 28. As will be evident to those having ordinary skill in the art, the cable 34 can be routed external to a cross member of the stroller frame 28 or can be routed indirectly between the first and second brake assemblies 22, 32 in a variety of ways.

In the disclosed example, each of the rear wheels 20 is essentially identical in construction and, thus, only one is described. Details of the wheel 20 described herein can be applicable to the wheel on either side of the stroller 24. In the disclosed example, the wheel 20 has a tire 40 disposed circumferentially around a rim 42. The rim 42 is carried on a plurality of spokes 44 in a conventional manner. One end of the spokes 44 are connected to a central hub 46. The spokes 44 emanate radially outward from the hub 46 and are joined at their other ends to the rim 42. The wheel 20 including the tire 40, rim 42, and spokes 44 can be integrally molded as a one-piece structure or can be formed of multiple components assembled to one another. The materials and construction of the wheel 20 can vary considerably and yet fall within the spirit and scope of the present invention.

The hub 46 defines a wheel axis A about which the wheel 20 rotates during use. The axis A is oriented concentric with a central bore 48 through the hub 46 that defines the wheel axis. A plurality of recesses or pockets 50 are provided on the wheel 20 and form a part of the brake system. Depending on one's interpretation of the brake assembly and/or the location of the pockets 50, the plurality of pockets can be considered to form part of the brake assembly 22. In this example, the pockets 50 are provided directly on or attached to the inner side of hub 46 and the wheel 20. On many strollers, similar pockets are provided on a wheel hub but face in a radially outward direction away from the wheel axis. The brake system 30 disclosed and described herein could be constructed so as to utilize such a hub and pocket design in an alternate example. However, such an example is not shown or described herein. In the disclosed example, the pockets 50 are open facing radially inward toward the wheel axis A and are spaced outward from the axis A and arranged circumferentially around the axis and the hub 46.

With reference to FIGS. 1 and 2, the first brake assembly 22 generally has a housing assembly 52 with a first part 54 and a second part 56. The first part 54 has an open side 58 that opens to an interior cavity 60. In this example, the open side 58 of the cavity 60 faces away from the wheel 20 and the hub 46. An opposite closed side 62 on the first part 54 of the housing assembly 52 faces and mates to the inner side of the wheel hub 46. The second part 56 of the housing assembly 52 forms a cover that attaches over the open side 58 and closes off the cavity 60 within the housing assembly. A tower 64 projects up from the first part 54 on the housing assembly 52 and has an interior defining a portion of the cavity 60 in this example. With reference to FIG. 2, the open side 58 of the tower 60 is attached to a lower end of one of the rear legs 26 on the stroller frame 28. In one example, the connection between the tower 64 and the rear leg 26 mounts the brake assembly 22 to the rear leg. The second part or cover 56 of the housing assembly 52 can be configured to capture the lower end of the rear leg 26 between the two parts of the housing assembly. The configuration and construction of the housing assembly 52 can also vary from the example shown and describe herein within the spirit and scope of the present invention.

Figure 3:
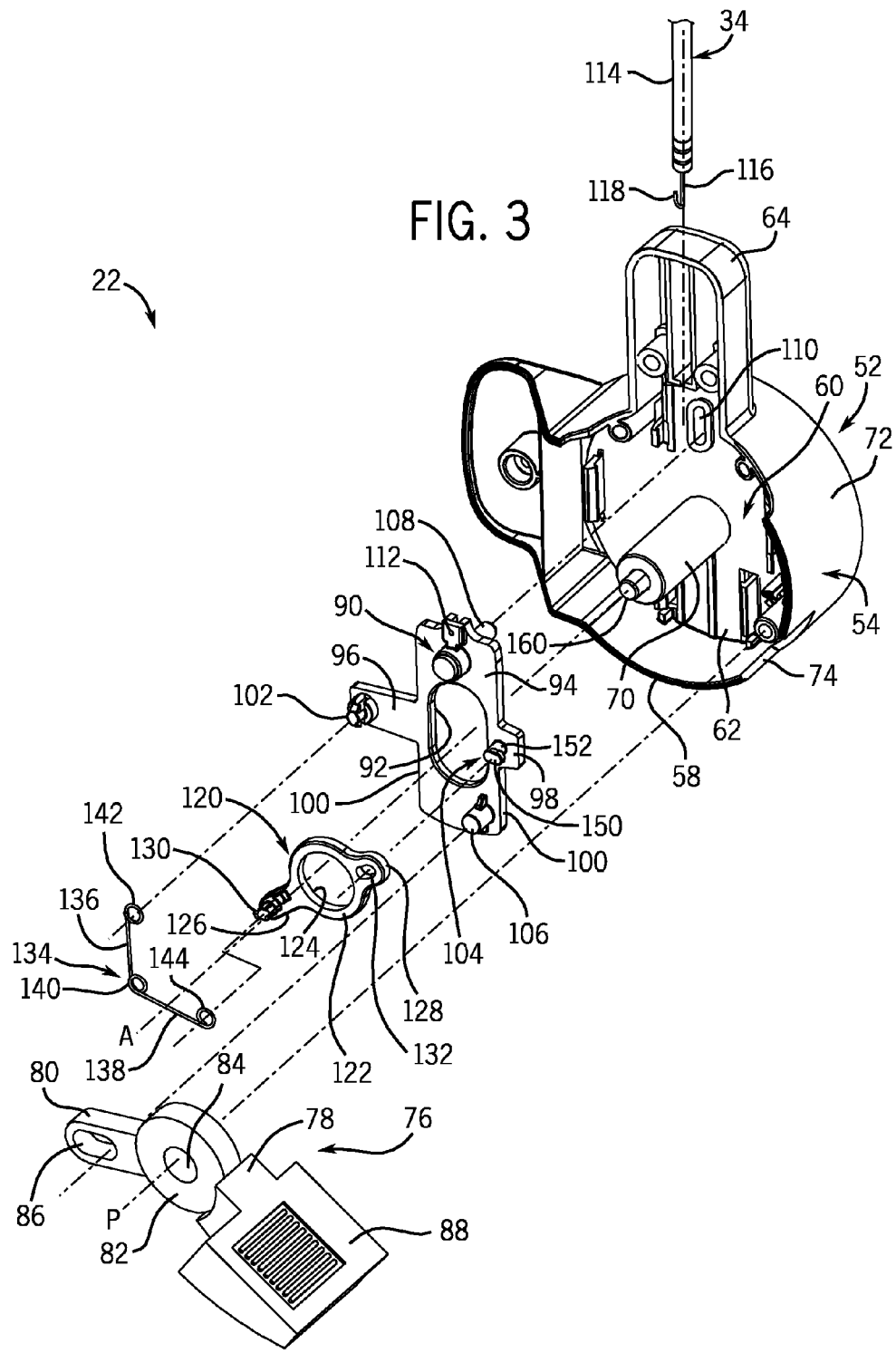
FIG. 3 shows a perspective exploded view of the brake assembly of FIGS. 1 and 2.

With reference to FIGS. 1 and 3, the working components of the first brake assembly 22 are shown and described. An axle shaft 70 is provided in the form of a cylinder that protrudes from the closed side 62 on the first part 54 of the housing assembly 52 and into the cavity 60. The axle shaft 70 is co-axially aligned with the axis A. The first part 54 of the housing assembly 52 has a perimeter wall 72 surrounding and defining the bulk of the cavity 60. A notch or cut out 74 is formed in the perimeter wall 72. An actuator or brake lever 76 has a drive arm or pedal arm 78 and a link arm 80 that are affixed to one another at an elbow 82. A pivot opening 84 is provided through the elbow and 82 and defines a pivot axis P of the brake lever 76. The link arm 80 and pedal arm 78 extend radially from the pivot axis P of the elbow 82 in different directions. In this example, the arms 78, 80 are oriented at an obtuse angle relative to one another but are not directly opposite or 180 degrees from one another. This angle can be different, as needed for a particular component arrangement.

A drive slot 86 is provided near the distal end of the link arm 80 and a foot pad 88 or contact pad is provided at the distal end of the pedal arm 78. The brake lever 76 is pivotally secured to the first part 54 of the housing assembly 52 via the pivot opening 84. A portion of the pedal arm 78 inclusive of the foot pad 88 is positioned external to the first part 54 of the housing assembly 52. The foot pad 88 protrudes through the notch or cut out 74 in the perimeter wall 72 and is accessible outside of the housing assembly 52 and. Actuation of the brake lever 76 is affected by contacting and pivoting the drive arm or pedal arm 78 about the axis P in this example. This is accomplished by applying force to the foot pad 88 as described below.

A slider plate or shuttle 90 is positioned within the cavity 60 and has an oblong or elongate slot 92 formed through its body 94. The axle shaft 70 is received through the slot 92 in the shuttle 90 and is sized to closely fit the width of the slot. The shuttle 90 has a width sized to fit within the cavity portion of the tower 64, which creates a slide track and permits the shuttle 92 to slide up and down within the cavity. The travel distance of the shuttle 90 is limited by the length of the slot 92 and contact between the axle shaft 70 and the ends of the slot. The positioning and shape of surfaces within the tower 64, the slot 92, and axle shaft 70 results in the shuttle 92 traveling along a linear path in this example. The body 94 of the slide plate or shuttle 90 in this example has a rectangular shape. The slot 92 is linear and is oriented lengthwise through the body 94.

A pair of widthwise projections including a long extension 96 and a short extension 98 protrude from opposite side edges 100 of the body 94. A spring pin 102 projects from a surface of the long extension 96 near its free end. A linkage pin 104 projects from a surface of the short extension 98 on the same side of the shuttle 90 as the spring pin 102. A link arm stud 106 protrudes from the body 94 near the lower end of the shuttle 90 below the slot 92. A brake boss 108 protrudes from a surface of the body 94 in a direction opposite the pins and stud 102, 104, and 106. In this example, the brake boss 108 is in the form of a pin or stud that passes through the body 94. The brake boss 108 is positioned near an upper end of the body 94 above the slot 92 on the shuttle.

A boss slot 110 is formed through the closed side 62 on the first part 54 of the housing assembly 52. The brake boss 108 extends through the boss slot 110 to the opposite side or outer side of the first part 54 and into the hub 46 on the wheel 20. The brake boss 108 can move along the slot 110 as the shuttle 90 slides up or down. In doing so, the boss 108 can engage or disengage any one of the plurality of pockets 50 in the hub 46 as described below. The brake boss 108 and slot 110 also assist in guiding the shuttle 90 along a linear path in this example.

A cable connector 112 is provided on the top edge of the body 94 on the shuttle 90. As shown in FIG. 3, the cable 34 has an outer sheath 114 and a wire 116 extending through the sheath. An exposed end of the wire 116 has a shaped end 118, such as a hook in this example, is configured to attach to the connector 112, such as via a hole in the connector 112, coupling the cable 34 to the shuttle 90. The sheath 114 is held stationary and the wire 116 of the cable 34 slides along the sheath in concert with movement of the shuttle 90 in this example. The configuration and construction of the cable connector 112 and the shaped end 118, i.e., the hook, of the wire 116 can vary and yet function as intended. The shaped end 118 can be a slug crimped, soldered, or otherwise attached to the end of the wire 116 and the slug can be connected to or captured on the shuttle. Alternatively, other configurations or devices can be provided to connect the wire 116 to either the connector 112 or directly to the shuttle 90.

The first brake assembly 22 can have a biasing mechanism or an over-center linkage within the cavity 60 of the housing assembly 52. In this example, an over-center link 120 has a central ring 122 with a hole 124 in the center of the ring. The hole 124 is sized to closely fit over the diameter of the axle shaft 70. The over-center link 120 can rotate about the axle shaft 70 and thus the wheel axis A. The over-center link 120 has a long finger 126 and a short finger 128 extending radially outward from the central ring 122 and in generally opposite directions relative to one another. As with the brake lever arms 78 and 80, the relative orientation of the fingers 126, 128, i.e., the angle between them, can vary from the example shown and described herein. In this example, the fingers 126, 128 are arranged relative to one another at an obtuse angle that is close to but less than 180 degrees. A second spring pin 130 projects from a surface of the long finger 126 near its distal end. The second spring pin 128 projects in a direction away from the closed side 62 of the first part 54 of the housing assembly 52 when assembled, similar to the pins and stud 102, 104, and 106. A link slot 132 is formed through the short finger 128.

A torsion spring 134 has first and second spring legs 136 and 138 oriented at an angle relative to one another and projecting from a central coil 140. Each leg 136, 138 has a loop 142, 144, respectively, at its distal end. The loop 142 on the first leg 136 of the spring 134 is connected to the first spring pin 102 on the long extension 96 of the shuttle 90. The loop 144 on the second leg 136 is connected to the second spring pin 130 on the long finger 126 of the over-center link 120. When installed, the legs 136, 138 are squeezed and compressed toward one another, resulting in the legs of the spring 134 being biased away from one another.

The linkage pin 104 has an elongate head 150 forming a key at the tip of a circular stem 152 of the pin. The head 150 is sized to be received through the link slot 132, forming a way in the short finger 128 on the link 120 when the key and way are aligned. The key and way are oriented out of alignment when installed. The head 150 thus maintains the connection between the link slot 132 of the over-center link 120 and the linkage pin 104 on the shuttle 90. However, the two parts are free to rotate relative to one another and the shape of the slot 132 and the stem 152 allows some play to inhibit binding during brake system usage. The link arm stud 106 on the shuttle 90 is likewise captured in the drive slot 86 on the brake lever 76. These two parts are also free to rotate relative to one another and the shape of the drive slot 86 and the circular link arm stud 106 allows some play to also inhibit binding during brake system usage. As discussed below, actuation of the brake lever 76 will drive the interconnected components of the first brake assembly 22 to apply or release the brake. In this example, the spring 134, over-center link 120, and shuttle 90 cooperate to create the biasing mechanism or over-center linkage function.

The configuration and construction of the various working components including the actuator or brake lever 76, the shuttle 90, the over-center link 120, and the spring 134 can vary from the example shown and described herein above and yet function as intended. The shape and configuration of these parts can be altered and yet perform as intended. The various positioning of the pins, studs, slots, fingers, and extensions on these components can also be altered and yet achieve a brake system that falls within the scope and teachings of the present invention.

The function and operation of the brake system 30 is now described in greater detail with reference to FIGS. 4-8. The brake system 30 is in a released condition in FIGS. 4 and 6 and in an applied or braking condition in FIGS. 5 and 7. The brake lever 76 in this example is in a raised or released orientation with the brake system in the released condition. The brake lever 76 is in a lowered or braking orientation with the brake system in the applied condition. It is within the spirit and scope of the present invention for the reverse to be true. In other words, the brake lever 76 could be in a raised position when the brake system is applied and a lowered position when the brake system is released. It is also possible for the actuator or brake lever 76 to move along a different path, such as side to side instead of up and down, in order to apply or release the brake system 30.

Figure 6:
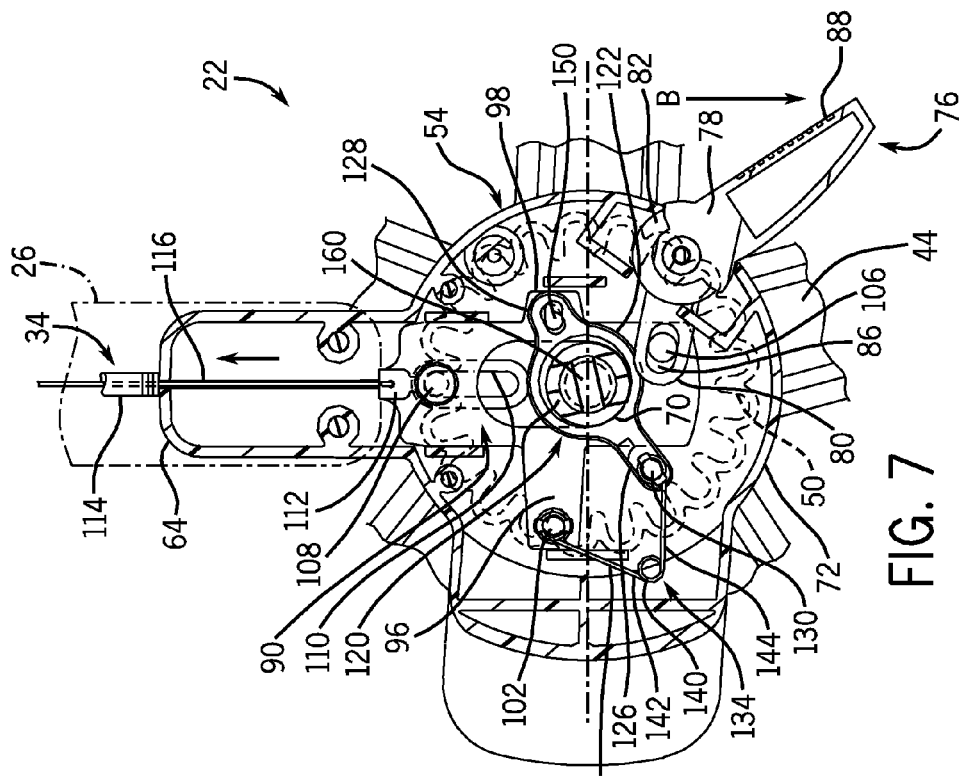
FIG. 6 shows a cross-section taken along line 6-6 of the stroller frame, wheel, and brake assembly on the right side in FIG. 4 and in the released condition.

FIG. 6 shows the first brake assembly 22 in the released condition. The brake lever 76 is in the raised or released orientation, wherein the pedal arm 78 and foot pad 88 are raised. However, because the link arm 80 is on the opposite side of the elbow 82 and pivot opening 84, the link arm 80 is in a lowered position in the released condition. With the link arm 80 lowered, the shuttle 90 is pulled down to a released position by the interconnection between the drive slot 86 and link arm stud 106. With the shuttle 90 drawn downward, the brake boss 108 is also pulled downward toward the axis A. In this position, the brake boss 108 is withdrawn or disengaged from and clear of the plurality of pockets 50. The brake is thus released, allowing the wheel 20 to rotate freely about the wheel axis A.

In the released condition with the shuttle 90 in the lowered or downward released position, the linkage pin 104 is also in a downward position. With reference to FIG. 6, the linkage pin 104 is position below the elevation of the wheel axis A. The short finger 128 on the over-center link 120, which is connected to the linkage pin 104, is also positioned below the level of the axis. This arrangement rotates the long finger 126 upward, which positions the second spring pin 130 above the level of the wheel axis A. With the shuttle 90 in this lower, released position, the first spring pin 102 on the long extension 96 of the shuttle is positioned below the level of the wheel axis A as well as below the level of the second spring pin 130. The first spring pin 102 is also positioned a further distance from the wheel axis A than the second spring pin 130 because the long extension 96 on the shuttle is longer than the long finger on the over-center link 120.

In this released condition, the first and second loops 142 and 144 on the torsion spring 134 are spaced closely relative to one another against the bias of the spring. With the second spring pin 130 being higher than the first spring pin 102 and being radially closer to the wheel axis A, the torsion spring 134 biases the over-center linkage 120 in a clockwise direction with reference to FIG. 6. In other words, the second leg 138 of the spring 134 pushes up against and biases the long extension 126 of the over-center link 120 upward. The short finger 128 on the opposite side of the over-center link 120 pushes down against and biases or drives the linkage pin 104 and thus the shuttle 90 downward. Further, the first leg 136 of the spring 134 pushes down against and biases the first spring pin 102 downward, which pushes the long extension 96 of the shuttle 90 downward.

In the released condition, the spring biases the over-center link 120 in the clockwise direction with reference to FIG. 6. As a result, the over-center linkage or biasing mechanism, inclusive of the spring 134, the shuttle 90, and the over-center link 120, biases the shuttle 90 downward and biases the brake lever 76 upward in the direction of and holding the shuttle in the released position and brake lever in the released orientation. The brake boss 108 is biased downward with the shuttle 90 in the direction of the released condition shown in FIG. 6. The boss 108 is held clear of the plurality of pockets 50 in the hub 46 when the brake lever 76 is in the released orientation and the shuttle 90 is in the released position.

Figure 7:
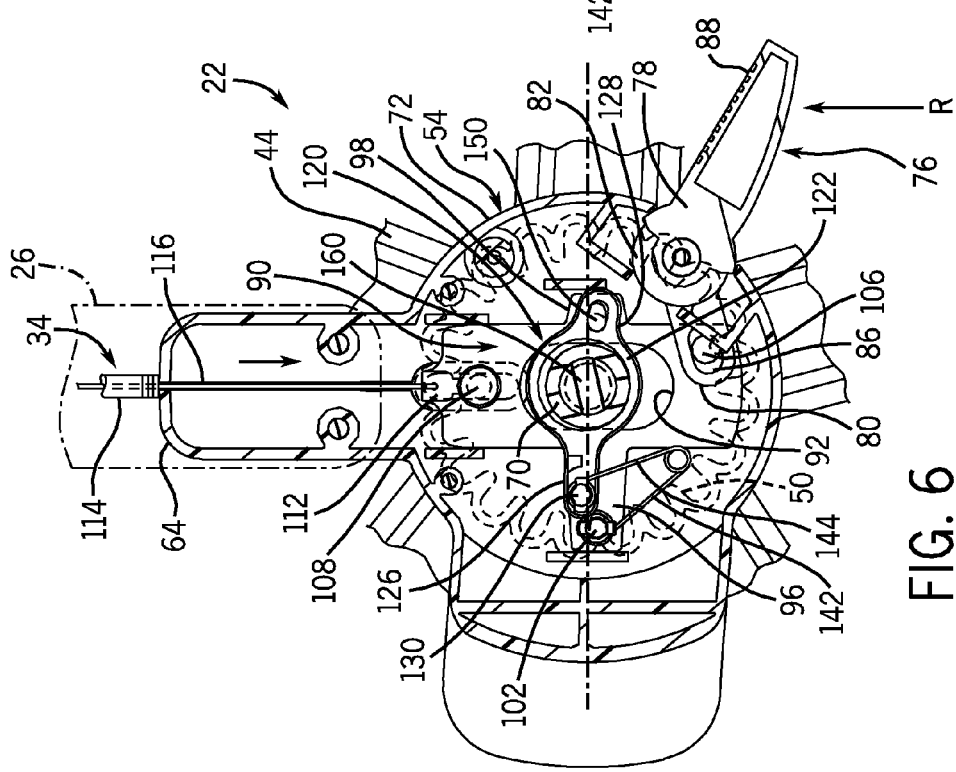
FIG. 7 shows a cross-section taken along line 7-7 of the stroller frame, wheels, and brake assembly on the right side in FIG. 5 and in the applied condition.

A user can apply a downward force in the direction of the arrow B onto the foot pad 88 of the pedal arm 78 to reconfigure the first brake assembly 22 from the released condition to the braking condition. With sufficient pressure to overcome the force of the spring 134, the brake lever 76 will pivot downward or in a clockwise direction with reference to FIGS. 6 and 7. Moving the brake lever 76 in this direction raises the link arm 80, which in turn raises the shuttle 90. Raising the shuttle 90 drives the brake boss 108 into engagement with one of the plurality of pockets 50 as shown in FIG. 7. Raising the shuttle 90 also raises the linkage pin 104 carried on the short extension 98. This in turn raises the short finger 128 of the over-center link 120 because it is connected to the linkage pin 104. This rotates the over-center link 120 in a counterclockwise direction about the axis A with reference to FIG. 7. This also moves the second spring pin 130, which is carried on the long finger 126 on the over-center link 120, downward.

The second leg 138 of the spring 134 is connected to the second spring pin 130 and thus is driven downward as the over-center link 120 rotates counterclockwise. However, the first leg 136 of the spring 134 will be driven upward as the shuttle slides up because it is connected to the first spring pin 102 on the long extension 96 of the shuttle. With the brake boss 108 seated in one of the pockets 50, the first brake assembly 22 is applied or in a braking condition. The brake boss 108 is held fast with the shuttle in the braking position and the brake lever 76 in the braking orientation and thus prevents rotation of the wheel 20.

With reference to FIG. 7, the first and second legs 136 and 138 of the torsion spring 134 in this example are still in a compressed state and are still biased away from one another. The first leg 136 is oriented relative to the first spring pin 130 on the long extension 96 such that it pushes upward against the first spring pin, biasing the long extension and the shuttle 90 up in the direction of the braking position. The second leg 138 is oriented relative to the long finger 126 on the over-center link 120 such that it pushes down against the second spring pin 130 on the long finger 126 of the over-center link 120. Thus, the spring 134 in this braking condition applies a biasing force to the working components of the first brake assembly 22 toward the braking position.

In the braking condition, the spring biases the over-center link 120 in the counterclockwise direction with reference to FIG. 7. As a result, the over-center linkage or biasing mechanism biases the shuttle 90 upward and biases the brake lever 76 downward in the direction of and holding the shuttle in the braking position and brake lever in the braking orientation. The brake boss 108 is biased upward with the shuttle 90 in the direction of the braking condition shown in FIG. 7. Engagement of the boss 108 in one of the pockets 50 in the hub 46 is maintained.

The spring 134 is fixed only by the two loops 142, 144 to components of the first brake assembly 22 in this example. The central coil 140 of the torsion spring 134 floats free and thus allows the spring to move and reposition as needed during actuation of the brake lever 76 between the braking and released conditions. The position of the central coil 140 changes relative to the loops 142, 144 from one condition to the other. As shown in FIG. 6, the coil is positioned to the right of both of the loops 142, 144 (the released condition) and to the left of both loops (the braking condition) in FIG. 7. Repositioning of the spring 134 alters the direction of the spring forces applied by the two legs 136, 138 from one condition to the other.

The over-center linkage or biasing mechanism disclosed herein thus assists in retaining the first brake assembly 22 in the released condition and also assists in retaining the first brake assembly in the braking condition. The over-center link 120 and spring 134 achieve an over-center condition at some point between the braking and released conditions and thus at some point between the braking and released positions of the shuttle 90 and the braking and released orientations of the brake lever 76.

A caregiver need only apply an upward force in the direction of the arrow R to an underside of the pedal arm 78 and foot pad 88 as shown in FIG. 6 to release the first brake assembly 22 from the braking or applied condition of FIG. 7. Actuation of the brake lever 76 in this manner will return the working components of the first brake assembly 22 to the released condition as described above.

Figure 4:
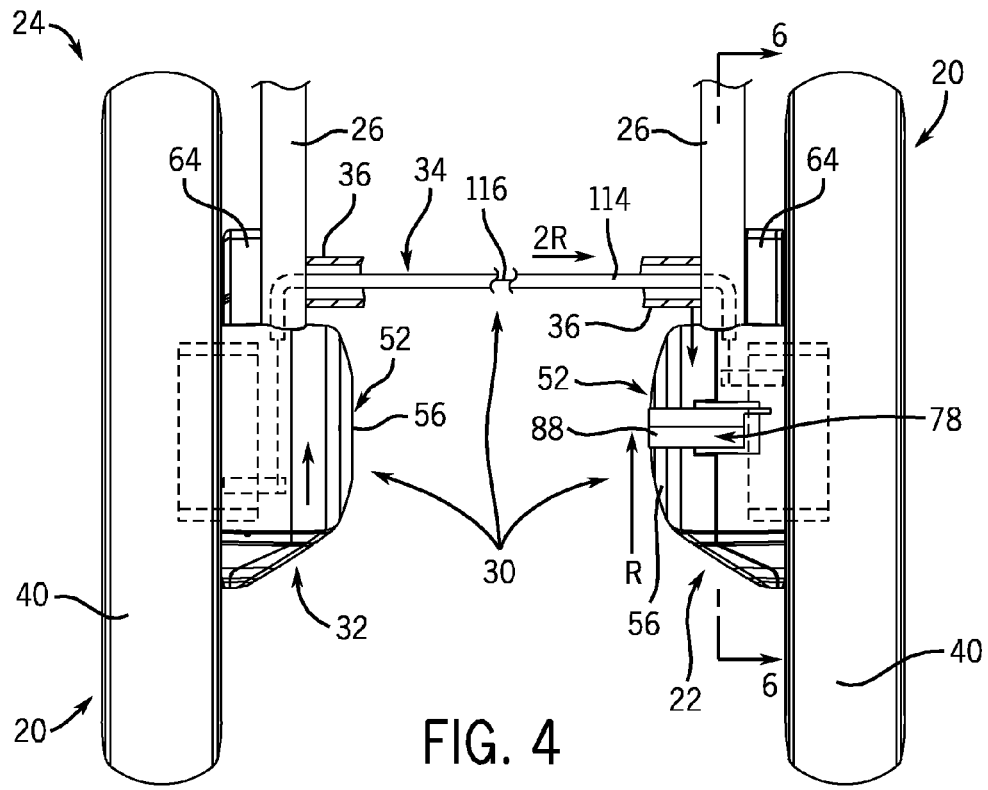
FIGS. 4 and 5 show a rear elevation view of the stroller frame, wheels, and brake system of FIG. 2 in a released condition and an applied condition, respectively.
Figure 5:
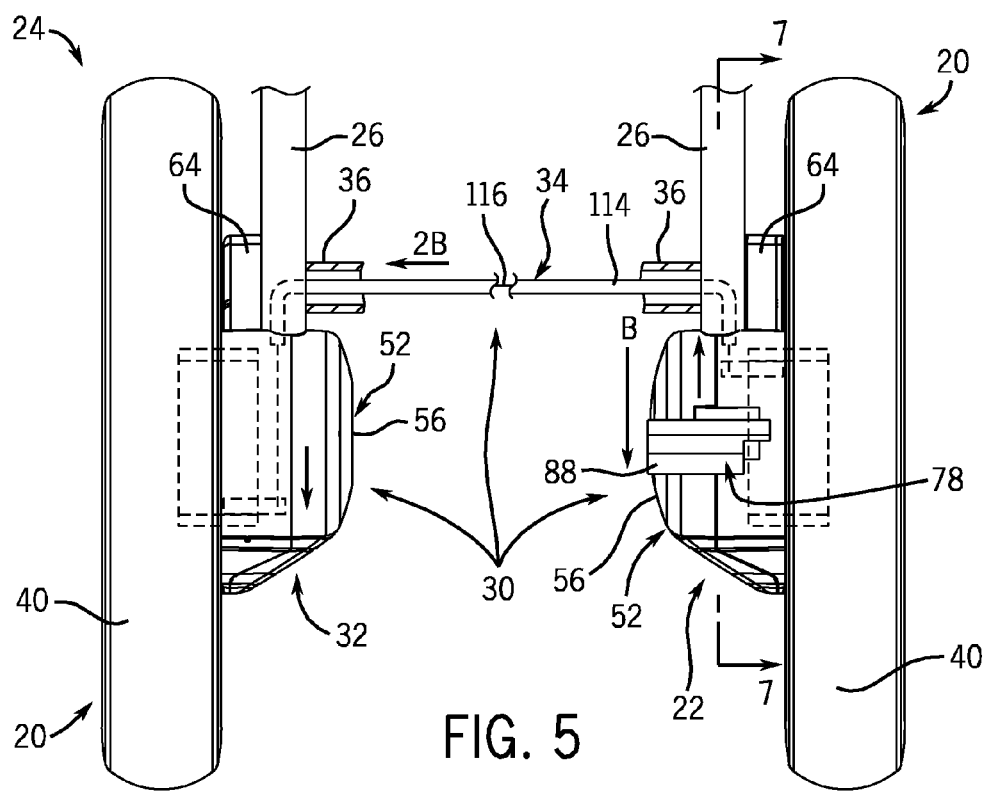

As noted previously and with reference to FIGS. 2, 4, 5, and 8, the brake system 30 disclosed and described herein has a second brake assembly 32 coupled to the wheel 20 on the other side of the stroller 24. The cable 34 extends from the first brake assembly 22 to the second brake assembly 32. As noted above, one end 118 of the cable 34 is connected to the shuttle 90 of the first brake assembly 22. As the shuttle 90 is moved by actuation of the brake lever 76, the wire 116 within the sheath 114 of the cable 32 will move accordingly. As shown in FIGS. 4 and 5, raising the brake lever 76 to the released orientation in the direction of the arrow R, which lowers the shuttle 90 as described above, draws the wire 116 within the cable 34 away from the second brake assembly 32 in the direction of the arrow 2R. Likewise, lowering the brake lever 76 to the braking orientation in the direction of the arrow B raises the shuttle 90 as described above and draws the wire 116 within the cable 34 away from the first brake assembly 22 in the direction of the arrow 2B.

Figure 8:
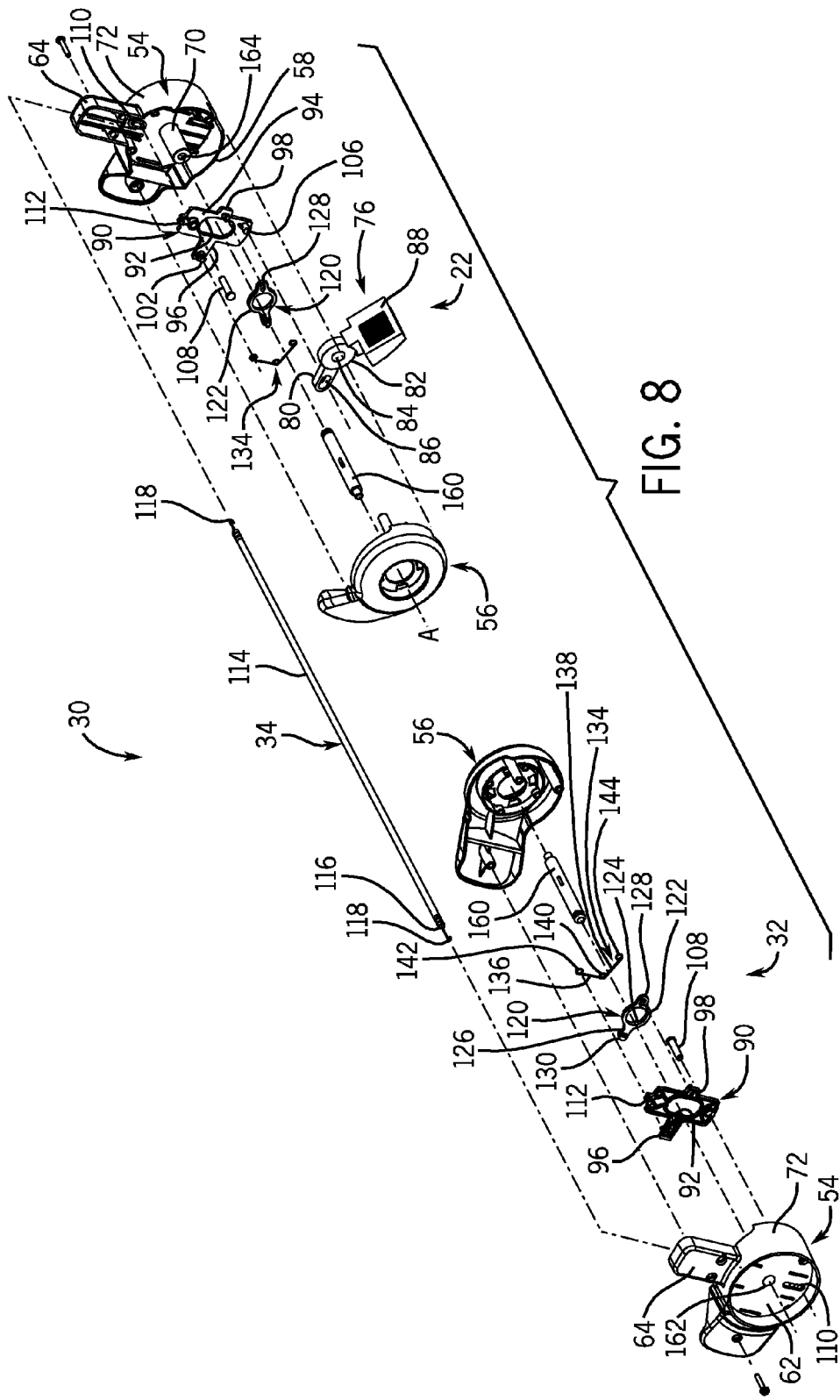
FIG. 8 shows an exploded perspective view depicting the components of the brake system of FIG. 2.

The cable 34 releases both of the brake assemblies 22, 32 or applies or engages both of the brake assemblies in accordance with movement of the lone brake lever 76. With reference to FIG. 8, the second brake assembly 32 essentially has a set of minor image working components within the housing assembly 52. The only significant difference is that the brake boss 108 of the second brake assembly 32 is positioned at the lower end of the body 94 on the second shuttle 90. This is permitted because there is no second brake lever 76 and thus no need for a link arm pin 106 on the second shuttle 90. An exposed second end of the wire 116 has a second hook 118 coupled to a second connector 112 on the second shuttle 90 in the second brake assembly 32. The two shuttles 90 are thus interconnected to one another via the cable 34, and specifically by the wire 116. As the shuttle 90 on one of the wheels 20 goes up, the shuttle 90 on the other of the wheels 20 goes down and vice versa. With the brake boss 108 being on the opposite end of the second shuttle 90 in the second brake assembly 32, both of the wheel brakes will be applied or released simultaneously upon movement of the cable 34 initiated by actuation of the brake lever 76.

As shown in FIG. 8, the first part 54 of the housing assembly 52 on the second brake assembly 32 is essentially the same as the first part 54 on the first brake assembly 22. However, in this example, the second boss slot 110 is also positioned below the wheel axis A on the closed side 62 to accommodate the alternate position of the brake boss 108 in the second brake assembly 32. Also as illustrated, each of the wheels 20 can be mounted to an axle 160. Each axle 160 can be positioned concentric with the wheel axis A and received through axle openings 162 in the closed sides 62 of the first housing parts 54 and through bores 164 in the axle shafts 70. The axles 160 can be constructed in a conventional manner and retain the wheels 20 connected to the housing assemblies 52.

The disclosed the brake system 30 is configured such that a user need only operate a single actuator or brake lever 76 in order to apply or release a wheel brake on each side of the stroller 24. The brake system 30 is also configured to apply a positive biasing force to assist in retaining the selected condition of the brake assemblies 22 and 32 on each side of the stroller 24. In the applied condition, the brake assemblies prevent rotation of the wheels 20 and the system is biased toward the applied condition. Likewise, in the released condition, the brake assemblies permit free rotation of the wheels and the system is biased to the released condition. The biasing mechanism or over-center linkage disclosed and described herein accomplishes this dual-biasing aspect of the invention.

As noted above, the configuration and construction of the working components of the brake assemblies 22 and 32 can vary within the spirit and scope of the present invention and yet function and intended. FIGS. 9 and 10 illustrate one of many possible alternate component arrangements, wherein like references numbers indicate like parts in comparison to the earlier described brake system example. FIG. 9 shows components of an alternate first brake assembly 200 in a released condition and FIG. 10 shows the components in an applied or braking condition. In this example, the brake assembly 200 has a first part 54 of a brake housing 52 constructed similarly to those previously described for the first brake assembly 22. Also, the brake assembly 200 has an actuator or brake lever 76 constructed similarly to that previously described for the first brake assembly 22.

In this example, a shuttle 202 has a body 204 with an elongate slot 206 that are similar in construction to those of the above-described shuttle 90. The shuttle 202 in this example has a brake boss 108 and a link arm stud 106 that are constructed and arranged in a manner similar to those on the shuttle 90. However, in this example, the shuttle 202 has only a single extension 208 projecting from a left side edge 210 of the body 204 with reference to FIG. 9. A torsion spring 212 in this example has a central coil first and second legs 216, 218 that project radially from the central coil 214 in different directions relative to one another. Each of the legs 216 and 218 terminates in a corresponding loop 220 and 222.

In this example, the first loop 220 on the first let 216 has a relatively large diameter and is sized to closely fit onto the axle shaft 70 on the first housing part 54. The second loop 222 on the second leg 218 is fitted on a spring pin 224 projecting from the lone extension 208 of the shuttle 202. The central coil 214 again floats free and allows the torsion spring 212 to move as the condition of the brake system is changed. When installed in the brake assembly 200, the legs 216, 218 are under compression and squeezed closer to one another against the bias of the central coil 214. This results in the legs 216, 218 being biased circumferentially away from one another. In this embodiment, the torsion spring 212 has a similar, but not identical construction than the torsion spring 134 described previously and there is no over-center link 120 in this example. The biasing mechanism in this example incorporates the shuttle, the shaft 70, and the spring 212.

In the released orientation shown in FIG. 9, the pedal arm 78 and foot pad 88 of the brake lever 76 are raised and the link arm 80 is lowered. This slides the shuttle 202 downward, which in turn draws the spring pin 224 down as well. In doing so, the second leg 218 and loop 222 are moved down below the level of the centerline of the shaft 70, i.e., the wheel axis A. With the spring 212 forcing the legs 216, 218 in opposite directions apart from one another, the shuttle 202 is biased downward, which in turn biases the brake boss 108 down, out of engagement with, and clear of the pockets 50 on the wheel hub 46, as described above. In the applied orientation shown in FIG. 10, the pedal arm 78 and foot pad 88 of the brake lever 76 are lowered and the link arm 80 is raised. This slides the shuttle 202 upward, which lifts the spring pin 224 upward as well. The second leg 218 and loop 222 are thus also raised above the level of the centerline of the shaft 70 or wheel axis A. With the spring 212 still forcing the legs 216, 218 apart, the shuttle is biased upward, which biased the brake boss 108 into engagement with one of the pockets 50, as described above. A cable 34 is connected to the top end of the shuttle 202.

Though not shown herein, the cable 34 would simultaneously operate a second brake assembly on the other side of the stroller in the same manner as previously described. The second brake assembly would have essentially the same components as the brake assembly 202, but with a brake boss 108 at the lower end of the shuttle.

Certainly, other alternate component arrangements and configurations for the brake assemblies are possible within the scope of the present invention. The invention is not intended to be limited only to the examples shown and described herein. Each of the springs 134 and 212 disclosed herein can be design to produce a desired spring force to create a correspondingly desired over-center tactile feedback to the user and desired force necessary to apply or release the stroller brakes. Also, the dimensions and configurations of the various links, linkages, and components of the disclosed brake systems can be altered to achieve a desired slider or shuttle travel distance as well as a desired spring orientation, spring pin position, and the like in each of the applied and released conditions. FIGS. 6 and 9 show a limited spring pin over-center condition relative to the level of the wheel axis A for the corresponding release conditions of the disclosed systems. The components can be altered to position one leg of the spring well above or well below the axis A in each of the released and applied conditions. This can be done to generate a greater spring biasing force and, thus, a greater force B or R necessary to move the actuator or brake lever from either orientation.

The examples disclosed above could also have a number of variations in assembly and composition within the scope of the invention. Each spring can be made of music wire and can hold the shuttle in either direction. Each shuttle can be made of Acetal, metal, or other suitable materials. Use of Acetal material can be a cost effective solution while providing part durability. The shuttle should slide smoothly from one position in the brake housing to the other. The brake pins or bosses can also be made of metal, such as steel. Instead of a Geneva gear arrangement or drive mechanism as depicted in the above examples, the drive mechanism could be a rack and pinion gear system or the like. The present invention could also be accomplished my mirroring the system with the pedal on the left side and without a pedal on the right side. The housings, over-center rings, brake levers, pins, studs, axle shafts, axles, and the like can also be made from known, suitable materials. The invention is not intended to be limited to any component being formed from any particular material.

Although certain stroller brake systems and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A brake assembly for a stroller comprising:
   a stroller wheel rotatable about a wheel axis;
   a plurality of pockets on the wheel spaced from and circumferentially around the wheel axis;
   a brake lever having an drive arm and a link arm fixedly connected to one another, the brake lever movable between a braking orientation and a released orientation;
   a boss driven by the link arm between a braking position and a released position corresponding respectively to the braking and released orientations of the brake lever; and
   a biasing mechanism configured to bias and retain the boss in one direction into engagement with one of the plurality of pockets when the brake lever is moved to the braking orientation and to bias and retain the boss in another direction out of engagement with the plurality of pockets when the brake lever is moved to the released position.

2. A brake assembly according to claim 1, wherein the plurality of pockets is formed on a surface of a center hub on the wheel, each of the plurality of pockets facing radially inward toward the wheel axis.

3. A brake assembly according to claim 1, wherein the actuator arm is a pedal arm and has a foot pad is carried on a distal end.

4. A brake assembly according to claim 1, wherein the wheel is rotatable about an axle.

5. A brake assembly according to claim 4, wherein the axle is received through an oblong slot of a shuttle and the wheel is mounted for rotation on the axle.

6. A brake assembly according to claim 1, wherein the biasing mechanism has a spring, an over-center link, a slidable shuttle connected to the over-center link and to the brake lever, the boss being carried on the shuttle and the spring connected to the over-center link and the shuttle.

7. A brake assembly according to claim 1, wherein the brake lever has an elbow between the actuator arm and the link arm and is pivotable about a lever axis spaced from the wheel axis.

8. A brake system for a stroller comprising:
   a first wheel rotatable on an axle on one side of the stroller;
   a brake actuator pivotally movable about a pivot point spaced radially from the axle between a braking orientation and a released orientation; and
   a first brake assembly that can be actuated by the brake actuator, the first brake assembly including
      a plurality of pockets on the first wheel spaced radially outward from and circumferentially around the axle;
      a first shuttle movable along a linear path perpendicular to the axle between a braking position and a released position corresponding respectively to the braking and released orientations of the brake actuator, the brake actuator having one end pivotally connected to the first shuttle;
      a first boss projecting from the first shuttle and configured to seat in any one of the plurality of pockets in the braking position; and
      a first over-center linkage coupled to the first shuttle and the brake actuator,
   wherein the first over-center linkage biases the first boss into engagement with one of the plurality of pockets when the brake actuator is moved to the braking orientation, and
   wherein the first over-center linkage biases the first boss out of engagement with the plurality of pockets when the brake actuator is moved to the released position.

9. A brake system according to claim 8, further comprising:
   a second wheel on a second side of the stroller opposite the one side; and
   a second brake assembly associated with the second wheel including a plurality of pockets on the second wheel, a second shuttle, a second boss, and a second over-center linkage, the brake actuator operable to simultaneously actuate the first and second brake assemblies.

10. A brake system according to claim 9, further comprising a cable interconnecting the first and second shuttles and extending between the sides of the stroller within a frame cross-member.

11. A brake system according to claim 8, wherein the first over-center linkage includes an over-center link rotatable about a rotation axis of the axle and a spring connected to the first shuttle and to the over-center link.

12. A brake system according to claim 8, wherein the first shuttle has a body with a slot, the axle extending through the slot and the shuttle slidable perpendicular to the axle to the extent of the slot.

13. A brake assembly for a stroller comprising:
   a stroller wheel rotatable about a wheel axis;
   a plurality of pockets on the wheel spaced from and circumferentially around the wheel axis;
   a brake lever having a drive arm and a link arm fixedly connected to one another, the brake lever movable between a braking orientation and a released orientation;
   a boss driven by the link arm between a braking position and a released position corresponding respectively to the braking and released orientations of the brake lever; and
   a biasing mechanism configured to bias and retain the boss into engagement with one of the plurality of pockets when the brake lever is moved to the braking orientation and to bias and retain the boss out of engagement with the plurality of pockets when the brake lever is moved to the released position, wherein the biasing mechanism has an over-center link with a central opening concentric with the wheel axis, the over center link having one end coupled to a spring and an opposite end coupled to a slidable shuttle which carries the boss and which is pivotally connected to the brake lever.

14. A brake assembly according to claim 13, wherein the spring is a torsion spring with one leg connected to the over-center link and another leg connected to the shuttle.

15. A brake assembly according to claim 13, wherein the shuttle slides along a linear path aligned with and perpendicular to the wheel axis.

16. A brake assembly for a stroller comprising:
a stroller wheel rotatable about a wheel axis;
a plurality of pockets on the wheel spaced from and circumferentially around the wheel axis;
a brake lever having a drive arm and a link arm fixedly connected to one another, the brake lever movable between a braking orientation and a released orientation;
a boss driven by the link arm between a braking position and a released position corresponding respectively to the braking and released orientations of the brake lever;
a biasing mechanism configured to bias and retain the boss into engagement with one of the plurality of pockets when the brake lever is moved to the braking orientation and to bias and retain the boss out of engagement with the plurality of pockets when the brake lever is moved to the released position; and
a shuttle movable along a linear path perpendicular to the wheel axis and pivotally connected to a distal end of the link arm, the shuttle being movable between the braking and released positions, the boss affixed to and projecting from the shuttle.

17. A brake assembly according to claim 16, wherein the boss is a pin that is oriented parallel to the wheel axis and protrudes from a surface of the shuttle facing the plurality of pockets.

18. A brake assembly for a stroller comprising:
a stroller wheel mounted for rotation on an axle defining a wheel axis;
a plurality of pockets on the wheel spaced from and circumferentially around the wheel axis;
a brake lever having a drive arm and a link arm fixedly connected to one another, the brake lever movable between a braking orientation and a released orientation;
a boss driven by the link arm between a braking position and a released position corresponding respectively to the braking and released orientations of the brake lever; and
a biasing mechanism configured to bias and retain the boss into engagement with one of the plurality of pockets when the brake lever is moved to the braking orientation and to bias and retain the boss out of engagement with the plurality of pockets when the brake lever is moved to the released position,
wherein the axle is received through an oblong slot of a shuttle, and
wherein the boss is carried on the shuttle, which is pivotally connected to the link arm and movable in a linear path perpendicular to the wheel axis between the braking and released positions.

19. A brake assembly for a stroller comprising:
a stroller wheel rotatable about a wheel axis;
a plurality of pockets on the wheel spaced from and circumferentially around the wheel axis;
a brake lever having a drive arm and a link arm fixedly connected to one another, the brake lever movable between a braking orientation and a released orientation;
a boss driven by the link arm between a braking position and a released position corresponding respectively to the braking and released orientations of the brake lever; and
a biasing mechanism configured to bias and retain the boss into engagement with one of the plurality of pockets when the brake lever is moved to the braking orientation and to bias and retain the boss out of engagement with the plurality of pockets when the brake lever is moved to the released position,
wherein the biasing mechanism has a torsion spring with one leg connected to a slidable shuttle and another leg connected to an over-center link rotatable about the wheel axis.

20. A stroller wheel brake system comprising:
two wheels, one on each side of a stroller frame and each with a center hub defining a wheel axis;
a plurality of pockets spaced radially outward from and circumferentially around the wheel axis on each of the two wheels;
a brake lever mounted adjacent one of the two wheels and movable between a braking orientation and a released orientation;
a shuttle adjacent each of the two wheels, each shuttle movable along a path perpendicular to the wheel axis between a braking position and a released position corresponding respectively to the braking and released orientations of the brake lever;
a brake boss on each of the shuttles;
a cable extending between and connected to each of the shuttles; and
a biasing mechanism coupled to each of the shuttles configured to bias each brake boss in one direction into engagement with a pocket on the respective wheel when the brake lever is moved to the braking orientation and to bias each brake boss in a direction opposite the one direction out of engagement with the plurality of pockets on the respective wheel when the brake lever is moved to the released position.

* * * * *